United States Patent [19]

Berecz et al.

[11] Patent Number: 4,736,507

[45] Date of Patent: Apr. 12, 1988

[54] TOOL FOR SETTING PLASTIC RIVETS

[75] Inventors: Imre Berecz, Rancho Santa Margarita; Dennis L. Hinton, Yorba Linda, both of Calif.

[73] Assignee: Microdot Inc., Darien, Conn.

[21] Appl. No.: 31,654

[22] Filed: Mar. 30, 1987

[51] Int. Cl.$^4$ .............................................. B23P 11/00
[52] U.S. Cl. ................................................... 29/243.53
[58] Field of Search .................... 29/243.5, 243.53; 72/433, 409, 451, 482

[56] References Cited

U.S. PATENT DOCUMENTS 2,696,850 12/1954 Peterson ................................. 72/409
3,821,890 7/1974 Dewey ................................... 72/451
4,431,172 2/1984 Soda et al. ............................. 72/433

FOREIGN PATENT DOCUMENTS 749531 7/1980 U.S.S.R. ................................ 72/451

OTHER PUBLICATIONS

Bryant, Clarenc T., RCA Technical Notes, No. 1165, Sep. 7, 1976.

Primary Examiner—Robert C. Watson
Attorney, Agent, or Firm—Lyman R. Lyon

[57] ABSTRACT

A tool for forming a head on a plastic rivet while achieving and maintaining "draw up" of the elements to be conjugally secured thereby. The tool may be heated to facilitate head forming and to effect complete polymerization of a plastic rivet, such as a rivet comprising a "B" stage thermoset resin.

9 Claims, 2 Drawing Sheets

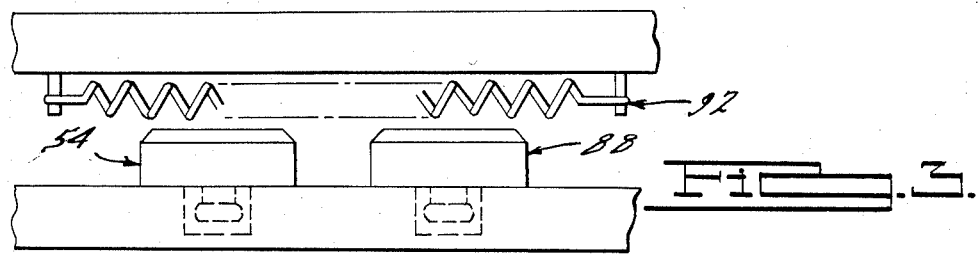
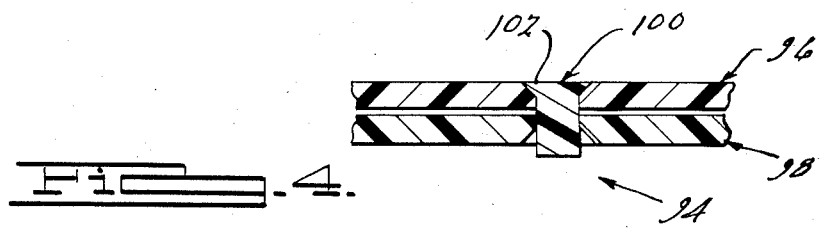
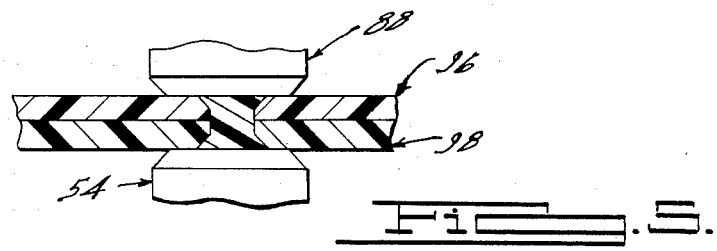
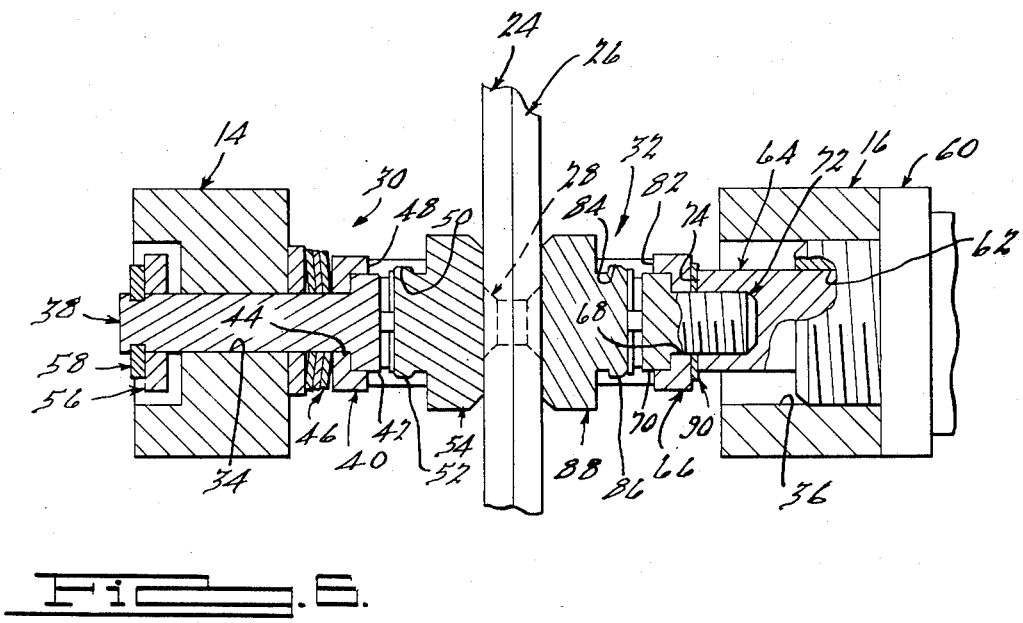

TOOL FOR SETTING PLASTIC RIVETS

BACKGROUND OF THE INVENTION

The invention relates to a tool for the setting of a plastic rivet used to conjugally secure a plurality of elements.

The prior art teaches the setting of a thermoplastic rivet by means of a tool employing a die to exert a compressive axial force on the end thereof so as to form the plastic to the shape of the die. Additionally, the prior art teaches the setting, or more accurately, the softening, head forming and complete polymerization, of a thermoset plastic rivet such as the "Composite Rivet" disclosed in U.S. No. 4,478,544, issued Oct. 23, 1984, and assigned to the assignee of the instant invention, by the following method: heat is applied to initiate softening and full polymerization of the "B" stage head forming portion(s) of the rivet, to be followed immediately thereafter by head forming, either by a mandrel having a head forming anvil in the case of a blind rivet, or by a heading tool comprising a die. Because of the difficulty of applying the heat to the thermoset rivet at the proper instant prior to and during the head forming operation, resort has been made to using plastics which remain as a "B" stage thermoset resin only at relatively low temperatures. The removal of such a rivet from the low temperature environment to ambient temperature conditions imparts sufficient heat thereto to initially soften, and eventually cause complete polymerization of, the rivet. A change in the rate of heat transfer to the rivet therefore has a marked effect on the physical properties of the rivet and the "setting" process.

The aforementioned teachings do not disclose a tool having easily removable heated head forming dies having a spring-biased lost motion connection therebetween so as to prevent damage to the elements being joined upon initial tool clamping and during maintenance of tool clamping force during polymerization of the rivet.

SUMMARY OF THE INVENTION

The tool of the instant invention comprises a heated head forming die that both forms a head on a plastic rivet and effects complete polymerization thereof while achieving and maintaining "draw up" of the elements to be conjugally secured thereby.

More specifically, the tool of the instant invention comprises a pair of dies that are supported by the legs of a U-shaped frame in linear opposition to one another so as to provide a compressive axial load on opposite ends of a rivet extending through an aperture in a pair of elements to be joined. The tool incorporates means providing for a lost motion connection between one of the dies and the frame so as to achieve a constant axial load on the rivet notwithstanding variations in the length of the rivet and/or the thickness of the clamped elements subsequent to the initial clamping movement. The tool may include a die that is removably attached to the U-shaped frame so as to accommodate the heating of the die by conventional means, such as exposure to a resistance heating element. The heat imparted thereto may be used to facilitate the softening of the plastic rivet prior to and during head forming, and to effect controlled polymerization of the rivet by virtue of its readily ascertainable heat transfer characteristics.

BRIEF DESCRIPTION OF THE DRAWINGS

FIG. 3 is a view of the dies of the tool of FIG. 1 exposed to a resistance heating element.

FIG. 4 is a sectional view of two elements to be conjugally secured by a rivet having a single preformed head.

FIG. 5 is a view, similar to FIG. 4 and partly in section, of two elements placed in contiguous contact by the rivet head forming dies of the tool of FIG. 1 as the second head of the rivet is formed and the rivet is completely polymerized.

FIG. 6 is a enlarged top view, partly in section, partly cut-away, of the die support and biasing mechanisms of the tool taken along line 6—6 of FIG. 1.

DETAILED DESCRIPTION OF THE PREFERRED EMBODIMENT OF THE INVENTION

Figure 1:
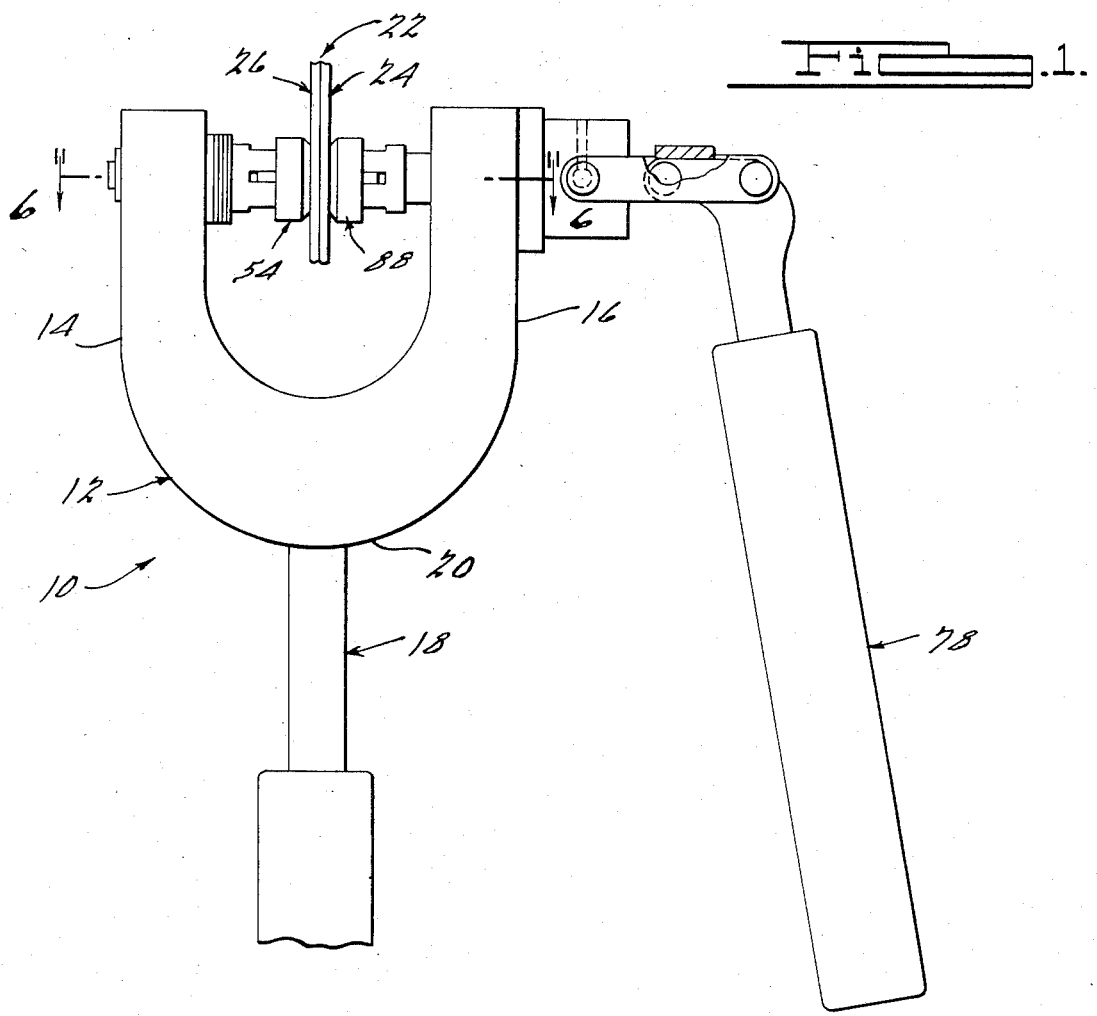
FIG. 1 is a partial side view in elevation, partly in section, of a rivet head forming tool constructed in accordance with the instant invention maintaining "draw up" of two elements to be conjugally secured by a rivet, the heads of which are being formed in the tool's dies.

Referring to FIG. 1, a tool for setting plastic rivets 10 constructed in accordance with the instant invention comprises a U-shaped frame 12 having a pair of spaced legs 14 and 16 and a handle 18 attached to the bight 20 thereof to facilitate placement of the tool about a workpiece 22. The workpiece 22 may consist of two or more layers of composite material 24 and 26 that are to be conjugally secured as by a plastic rivet 28 comprised of a "B" stage thermoset resin. The U-shaped frame 12 is provided with a pair of opposed collinear die supports 30 and 32 which are supported in circular apertures 34 and 36, respectively, of the legs 14 and 16 of the U-shaped frame 12.

As seen in FIG. 6, the die support 30 comprises a cylindrical shank 38, an annular collet 40 secured to the shank 38 as by interlocking flanges 42 and 44, and a plurality of Belleville springs 46. The collet 40 is provided with a plurality of longitudinal slots 48 and an internal groove 50 to removably accept and secure the outwardly flared stem 52 of a die 54. The shank 38 is free to float axially of the aperture 34 under the control of the Belleville springs 46. The axial load of the die 54 upon clamping is thus transferred by the collet 40 directly to the Belleville springs 46. The movement of the die support 30 is limited by a washer 56 which is retained in position by a snap ring 58.

Figure 2:
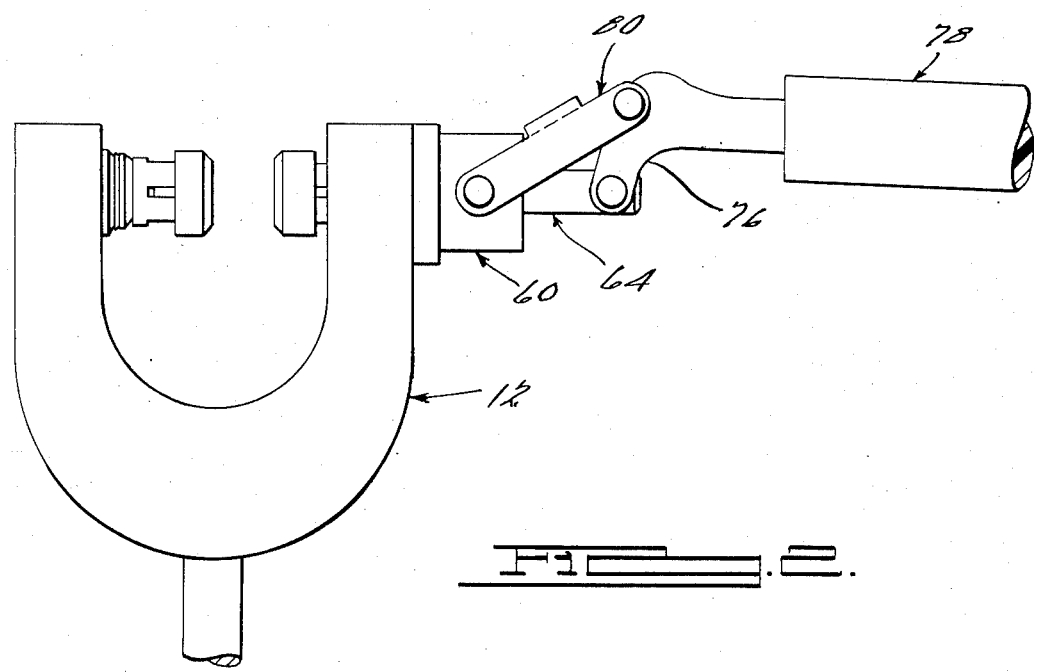
FIG. 2 is a partial side view in elevation of the tool of FIG. 1 with its head forming dies separated.

The die support 32 comprises a cylindrical plug 60 having a central longitudinal aperture 62, a cylindrical rod 64 placed within the aperture 62, and a collet 66 secured to the rod 64 as by interlocking a flange 68 formed thereupon with the head 70 of a machine bolt 72 threadably attached to the end 74 of the rod 64. The plug 60 is threadably secured in the aperture 36 of the leg 16. The rod 64 is thus free to move axially of the aperture 62 under the control of the dog-legged lever arm 76 of a second handle 78 attached to the frame 12 via the plug 60 and a fulcrum link 80, as seen in FIG. 2. The collet 66 is provided with a plurality of longitudinal slots 82 and an internal groove 84 to removably accept and secure the outwardly flared stem 86 of a second die 88. A shim 2^ may be placed between the flange 68 of the collet 66 and the end 74 of the rod 64 to further adjust the separational distance between the dies 54 and 88.

In operation, the maximum separation between the die supports 30 and 32 of the of the tool 10 is achieved by spreading the handles 18 and 78 apart from one another, to the positions shown in FIG. 2. The dies 54 and 88 are inserted within the collets 40 and 66, respectively, of the die supports 30 and 32. If desired, the dies 54 and 88 may be heated prior to attachment to facilitate rivet head forming, or to supply heat to ensure complete polymerization of the rivet 28, as by exposure to an electrical resistance heating element 92 as illustrated in FIG. 3.

FIG. 4 shows a workpiece 94 comprising two elements formed of composite material 96 and 98 to be placed in intimate contact and subsequently conjugally secured by a "B" stage thermoset plastic rivet 100 having a single preformed head 102. The dies 54 and 88 are positioned to either side of the workpiece 94 by manipulation of the handles 18 and 78 of the tool 10. The handles 18 and 78 are brought together, thereby initiating clamping action by the tool 10. Such movement of the handles 18 and 78 causes the rod 64 of the die support 32 to move axially of the plug 60 toward the opposing die support 30 until the elements 96 and 98 are in contiguity and the rivet 100 is maximally axially compressed, thereby forming a head 104 on the end of the rivet 100 opposite the preformed head 102. Further axial movement of the rod 64 after the minimum separational distance between the dies 54 and 88 is achieved is "lost" by the axial movement of the opposing die support 30 under the control of the Belleville springs 46.

It is noteworthy that a careful choice of the height-to-thickness ratio of the Belleville springs 46 will provide a force against the die support 30 which is constant over a considerable spring deflection range. Additionally, the Belleville springs 46 may be nested so as to provide a higher force for a given deflection. Thus, by varying the number and dimension of the Belleville springs 46, the workpiece 94 is subjected to any desired load characteristic when achieving the minimum separational distance between the dies 54 and 88. The constancy of such a load characteristic avoids the damage to the composite elements 96 and 98 due to shattering or cracking that typically results from the relatively high unit pressures achieved without such a lost motion connection.

The tool 10 remains clamped about the workpiece 94 for a period sufficient to ensure the complete polymerization of the rivet 100. Where heated dies 54 and 88 are utilized, the transfer of heat to the rivet 100 subsequent to clamping motion is readily controlled by virtue of the predictable heat transfer characteristics of the dies 54 and 88. Thus, polymerization of the rivet 100 may be hastened or slowed, as desired. The handles 18 and 78 are spread apart, and the workpiece 94 is thereby released. Although the dies 54 and 88 are shown as having flat forming surfaces, it may readily be appreciated that the instant invention contemplates the use of dies capable of producing any desirable rivet head configuration, including dies suitable for simultaneous forming of both rivet heads.

While the preferred embodiment of the invention has been disclosed, it should be appreciated that the invention is susceptible of modification without departing from the spirit of the invention or the scope of the subjoined claims.

I claim:
1. A tool for forming a head on a plastic rivet extending through a pair of elements to be joined, said tool comprising
   a U-shaped frame having a pair of spaced leg portions for disposition on opposite sides of said elements, said legs being connected by a bight portion;
   a rivet head forming die on one of said legs;
   a reaction die on the other of said legs laterally aligned with said head forming die;
   means for moving said head forming and reaction dies toward one another to clamp together said elements therebetween and to form a head on said rivet; and
   means for providing a lost motion connection between one of said legs and the one of said dies attached thereto, whereby the clamping force exerted on said elements by said dies remains constant notwithstanding variation in the combined thickness of said contiguously clamped elements.
2. A tool of claim 1 wherein said means for moving said head forming and reaction dies toward one another comprises
   a first lever rigidly attached to said bight; and
   a second lever mechanically linked with one of said dies, whereby movement of said second lever relative to said first lever produces linear displacement of said die toward or away from the other of said dies.
3. The tool of claim 1 wherein said means for providing a lost motion connection between one of said legs and the die attached thereto comprises a plurality of Belleville springs acting against said leg and said die.
4. The tool of claim 1 wherein one of said dies is attached to one of said legs by threaded fastener means, whereby the position of said die relative to the other of said dies is adjusted.
5. The tool of claim 1 including a shim inserted between one of said legs and said die attached to said leg for adjusting the position of said die relative to the other of said dies.
6. The tool of claim 1 including means for removably attaching one of said dies to one of said legs.
7. The tool of claim 6 wherein said means for removably attaching one of said dies to one of said legs comprises a collet attached to one of said legs and a stem formed on a surface of said die.
8. The tool of claim 7 wherein said collet comprises an annular collet having a plurality of longitudinal slots formed in one end thereof defining a plurality of arcuate segments, said segments being resiliently deflected radially outward by the insertion of the stem of said die into the slotted end of said collet.
9. A tool for forming a head on a plastic rivet extending through an aperture in a pair of elements to be joined, said tool comprising
   a U-shaped frame having a pair of spaced leg portions for disposition on opposite sides of said elements, said legs being connected by a bight portion;
   a rivet head forming die on one of said legs;
   a reaction die on the other of said legs laterally aligned with said head forming die;
   means for moving said head forming and reaction dies toward one another to form a head on said rivet;
   means for providing a lost motion connection between one of said legs and the die attached thereto, whereby the force exerted by said die against the other of said dies remains constant notwithstanding a change in separational distance between said dies subsequent to moving said dies toward one another to form a head on said rivet; and means for removably attaching one of said dies to one of said legs comprising a stem formed on a surface of said die, said stem having a radially outwardly extending flange formed thereupon; and an annular collet attached to one of said legs, said collet having a plurality of longitudinal slots formed in one end thereof defining a plurality of arcuate segments, and a circumferentially extending groove formed internally thereof, said segments being resiliently deflected radially outward by the insertion therethrough of said stem of said die into the slotted end of said collet, whereby said die is removably attached to said collet upon interlocking engagement of said flange and groove.

* * * * *